(12) United States Patent
Kemp et al.

(10) Patent No.: US 10,332,210 B1
(45) Date of Patent: Jun. 25, 2019

(54) SYSTEM AND METHOD FOR IMPLEMENTING COMPUTER MODELING TECHNIQUES

(71) Applicant: Nationwide Mutual Insurance Company, Columbus, OH (US)

(72) Inventors: John Kemp, Worthington, OH (US); Spencer Herath, Brooklyn, NY (US); Thomas Michael Winningham, Columbus, OH (US); Shannon Terry, Upper Arlington, OH (US); Christopher P. Nicholas, Worthington, OH (US); Kapwon Choi, Columbus, OH (US); Benjamin A. Ogorek, San Jose, CA (US)

(73) Assignee: Nationwide Mutual Insurance Company, Columbus, OH (US)

( * ) Notice: Subject to any disclaimer, the term of this patent is extended or adjusted under 35 U.S.C. 154(b) by 403 days.

(21) Appl. No.: 14/534,437

(22) Filed: Nov. 6, 2014

Related U.S. Application Data

(60) Provisional application No. 61/900,576, filed on Nov. 6, 2013.

(51) Int. Cl.
*G06Q 40/08* (2012.01)
(52) U.S. Cl.
CPC .................... *G06Q 40/08* (2013.01)
(58) Field of Classification Search
CPC ....................................................... G06Q 40/08
See application file for complete search history.

(56) References Cited

U.S. PATENT DOCUMENTS

| | | | | |
|---|---|---|---|---|
| 9,299,108 | B2* | 3/2016 | Diana | G06Q 10/10 |
| 2008/0077451 | A1* | 3/2008 | Anthony | G06Q 10/10 705/4 |
| 2009/0254379 | A1* | 10/2009 | Adams | G06Q 10/04 705/4 |
| 2010/0145734 | A1* | 6/2010 | Becerra | G06Q 40/08 705/4 |
| 2013/0226623 | A1* | 8/2013 | Diana | G06Q 10/10 705/4 |
| 2013/0268534 | A1* | 10/2013 | Mathew | G06F 17/30705 707/740 |
| 2014/0149144 | A1* | 5/2014 | Li | G06F 17/2785 705/4 |

(Continued)

OTHER PUBLICATIONS

Frees et al., "Predictive Modeling of Multi-Peril Homeowners Insurance", Casualty Actuarial Society E-Forum, Winter 2011.*

(Continued)

*Primary Examiner* — Eric T Wong
(74) *Attorney, Agent, or Firm* — Morgan, Lewis & Bockius, LLP (57) ABSTRACT

Improved computer modeling techniques, and uses thereof, are described herein. A set of unstructured textual data is received. Certain textual data is removed from the set of unstructured data to form an initial vocabulary set of textual data. One or more bigrams are added to the vocabulary set of textual data to form a final vocabulary set of textual data. The final vocabulary set of textual data is divided into a plurality of subsets of textual data based on type. A model is trained using each of the plurality of subsets of textual data to form a plurality of trained models, each corresponding to one of the types.

12 Claims, 7 Drawing Sheets

(56) References Cited

U.S. PATENT DOCUMENTS

2014/0358591 A1* 12/2014 Gray .................. G06Q 40/08
705/4

OTHER PUBLICATIONS

Allianz soars past goals with IxReveal advanced analytic software. (Jul. 14, 2008). Business Wire Retrieved from https://dialog.proquest.com/professional/docview/677162343?accountid=142257 (Year: 2008).*

Workers compensation fund implements HNC claims advisor for subrogation. (May 28, 2002). Business Wire Retrieved from https://dialog.proquest.com/professional/docview/679265909?accountid=142257 (Year: 2002).*

* cited by examiner

SYSTEM AND METHOD FOR IMPLEMENTING COMPUTER MODELING TECHNIQUES

CROSS REFERENCE TO RELATED APPLICATIONS

This application claims priority to U.S. Provisional Patent Application Ser. No. 61/900,576, filed Nov. 6, 2013, which is hereby incorporated by reference in its entirety.

FIELD OF THE INVENTION

The invention relates to improved computer modeling techniques.

BRIEF SUMMARY OF EMBODIMENTS OF THE INVENTION

Embodiments of the present invention relate to systems, methods and computer readable storage media for storing instructions which, when executed by a processor, perform a method for implementing improved computer modeling techniques. In connection with the improved modeling, a set of unstructured textual property claims data, corresponding to a plurality of property loss insurance claims, is received. At least certain textual data is removed from the set of unstructured textual property claims data to form an initial vocabulary set of textual data. One or more bigrams are added to the vocabulary set of textual data to form a final vocabulary set of textual data. A property loss type is identified for each of the plurality of property loss insurance claims. The final vocabulary set of textual data is divided into a plurality of subsets of textual data based on the property loss type. A model is trained using each of the plurality of subsets of textual data to form a plurality of trained models, each corresponding to one of the property loss types.

In some embodiments, the textual data removed from the set of unstructured textual data includes one or more of numbers, punctuation, stop words, and context-specific words that occur within the set of unstructured textual property claims data with a predetermined level of frequency.

In some embodiments, the property loss type comprises one of water, fire and damage by vehicle.

Further, in certain embodiments, data describing a property insurance loss claim is received. It is determined whether the property insurance loss claim is a qualifying claim. If so, a property loss type associated with the property insurance loss claim is identified. One of the plurality of models is selected based on the identified property loss type. Data describing the property insurance loss claim is processed using the selected model. Based on the processing, it is determined whether to analyze the property insurance loss claim for subrogation. In some embodiments, the determining includes determining whether the property insurance loss claim was initiated within the past 7 to 14 days.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE PREFERRED EMBODIMENTS

The modeling techniques described herein allow for automatic detection of recent insurance claims that have the potential for subrogation. Claims departments of insurance companies have a need for a standard review process to identify subrogation opportunities missed by claims adjusters employing a manual process. Subrogation is the legal doctrine that allows an insurance company to sue to recover losses caused by a third party. With the sheer volume of claims to be handled, insurance companies frequently miss subrogation opportunities, which means lost opportunities to recover for losses caused by a third party.

Previously, companies have relied on adjusters to detect subrogation opportunities manually based on the facts of the case. Typically, there was no formal review process for double-checking claims, except for claims that resulted in a large payout for the company. If a claims adjuster missed a subrogation opportunity on a smaller claim, the opportunity was lost forever.

Described herein is a method and system that employs an improved computer system for uncovering the claims that are the most likely candidates for subrogation. In connection with the system and method, subrogation can be reasonably accurately predicted based on the unstructured text within the logs of claims adjusters. The process below describes how a limited amount of structured data and copious amounts of unstructured text is used to detect missed subrogation opportunities efficiently.

The following describes a process for building the model in connection with one embodiment of the invention. The problem to solve involves binary classification: a claim is either a subrogation opportunity or it is not. In order to build the model, a random subset of past claims is chosen, each of which has been classified as either "subrogation" or "no subrogation." Because subrogation is a rare event, the majority of claims are not subrogation opportunities. If a sample representative of the population were used, any modeling technique would have a difficult time trying to detect the true differences between the two classification classes (i.e., subrogation and no subrogation). Therefore, the same number of "no subrogation" claims and "subrogation" claims are sampled randomly, so that the response variable in the sample has a 1:1 ratio.

The data used in connection with the technique is not structured in a table. Instead, the data is the unstructured, free-form text contained in the claims logs written by a claims adjuster. The differences in words contained within subrogation claims versus non-subrogation claims are the subject of the model. Generally, several log entries are attached to a single claim. These log entries are grouped together to comprise all the text associated with a single claim. Known natural language processing techniques are used to first prepare, and then train, the data.

Not all text contained in the log is important. Thus, the text first must be cleaned. For example, the claims log text is stripped of numbers, punctuation, stop words, infrequently occurring words, and a small set of frequently occurring unimportant words (e.g., "claim"). The unique set of the words that is left comprises the model's vocabulary. A selection of pre-identified bigrams (two-word phrases) is then added to this vocabulary. In some circumstances, two words in combination are more meaningful than they are separately. For example, the occurrence of "drunk driver" is a more powerful indicator of subrogation than simply individual occurrences of "drunk" or "driver." By way of additional example, "Los Angeles" is a city, but "los" and "angeles" are meaningless apart.

The unedited, unstructured text is then transformed into a vector space model of the vocabulary words that were contained within the claims text. This term-document matrix contains the word counts of each word within each document. Thus, instead of readable sentences, each document can be expressed by the number of occurrences of each of the words in vector space.

For example, given the text from two documents as follows:
Doc1="The dog chased the cat."
Doc2="The cat followed the cat."
the following term-document matrix is generated.

| Term-Document Matrix: | | |
| --- | --- | --- |
| Terms | Doc1 | Doc2 |
| cat | 1 | 2 |
| chased | 1 | 0 |
| dog | 1 | 0 |
| followed | 0 | 1 |

To improve model performance, the raw word count matrix is converted to a term frequency-inverse document frequency (TF-IDF) matrix. TF-IDF is a weighting factor that reflects how important a word is to a document in the whole collection of documents. The statistic increases the number of times a word appears in a document, but is offset by the frequency of the word in the collection as a whole. This helps determine what the most important words are in that specific document. This is the model's input and it is linked to the claim's response variable ("yes subrogation" or "no subrogation").

In the preferred embodiment, the improved modeling technique employs four separate models, based on four general causes of damage. The rationale for this multi-model approach is that different kinds of words can suggest subrogation, depending on what caused the damage that gave rise to the claim. In order to achieve this further classification, in one embodiment, available structured data may be used. For example, each claim may be associated with a Loss Cause Code, which indicates the general cause of the damage. Loss Cause Codes may be used to group claims into five general Loss Categories: "damage by vehicle," "fire," "water," "act of God," and "miscellaneous." First, "act of God" claims (e.g., claims caused by weather and natural disasters) may be filtered out because they are very rarely ever subrogation opportunities. Four unique models may then be trained on the remaining groups. This division allows for achieving a more accurate view of the true differentiators between the two response variables, because the claims contained within each category have a similar cause of damage. For example, every "damage by vehicle" claim will contain words like "car" and "driver." Because every claim within the "damage by vehicle" model contains such words, the model can actually look beyond the similar words and detect the more powerful words that detect subrogation opportunities, such as "drunk."

The four training sets are then used to build four Support Vector Machine (SVM) models. An SVM is a supervised classification technique, which attempts to find the optimal way to split the response variables (i.e., "yes subrogation" "no subrogation"). Other techniques could be used (e.g., Naïve Bayes and Logistic Regression) within the scope of the present invention. The models are then validated on a hold-out test set in order to ensure the results remain robust for unseen data.

The models are trained using a computer. The models and supporting code may be executed daily using the model execution engine environment, as described further herein.

In one embodiment, the model execution occurs regularly, e.g., every morning. At each execution (e.g., every morning), new claims are scored, and the highest scored claims (i.e. most likely for subrogation) are passed on to a subrogation specialist for further review. The following provides a technical overview of that process, in one exemplary embodiment.

After a model instance is generated, qualifying claims are prepared for scoring. In the exemplary embodiment, Python programming language is used to score the claims using the models that have been previously trained and saved. Other programming languages can be used within the scope of the present invention. Thus, a computer is programmed (e.g., in Python) using the particular instructions described herein, thereby improving the functioning of the computer. The scored claims are then ordered and prepared for the daily extract. Finally, the top scoring claims of the day are sent to a subrogation specialist for further review.

Figure 1:
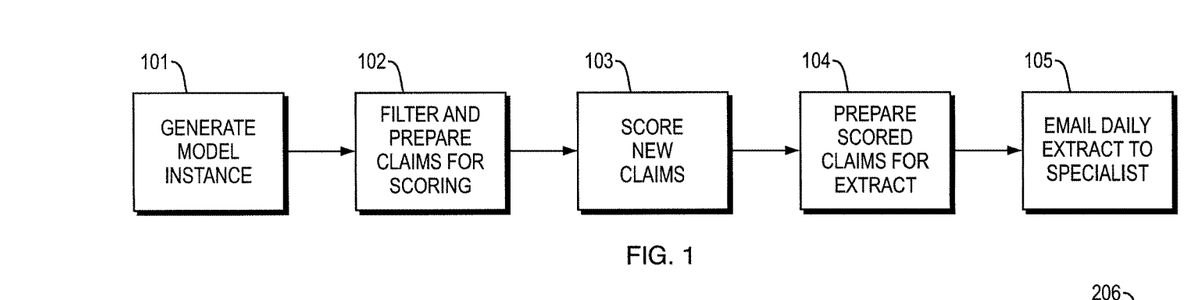
FIG. 1 illustrates an exemplary process of one embodiment of the present invention.

FIG. 1 illustrates the high-level process in an exemplary embodiment. In step 101, the model instance is generated. In step 102, the claims are filtered and prepared for scoring. In step 103, new claims are scored. In step 104, scored claims are prepared for extract. In step 105, extracts are transmitted to a specialist for review, e.g., daily, via email.

As described previously, only qualifying claims are sent for scoring. More particularly, in one embodiment, the claim is not sent immediately for review using the model. Approximately one weeks' time passes to allow the claims adjuster to collect relevant facts and, in some instances, identify a subrogation opportunity manually. The model only scores claims that are between about 7 and 14 days old, in one embodiment. However, claims that fall within other time frames in terms of age may be eligible for scoring within the scope of the present invention. If a subrogation opportunity is not caught by the 14th day, then the opportunity is typically lost. In the exemplary embodiment, the model runs every weekday, and claims are rescored every day while they are in the 7-14 day window. Claims are rescored daily in order to account for any new information that may have been added to the claims logs.

Next, claims are grouped into Loss Categories based on their individual Loss Cause Codes. Claims that fall under the categories "Act of God" and "Liability" are filtered out and are not scored. These types of claims have an extremely low rate of subrogation simply due to the nature of the claims. For "Damage by Vehicle" claims, the data regarding such claims can be processed to determine whether the homeowner was the driver of the vehicle (i.e., if the policyholder drove into his own house, there is no third party at fault and, therefore, there is no subrogation opportunity). Claims for which the policyholder was at fault are filtered out. Thus, a claim that is qualified to be scored, in the preferred embodiment, (1) is between 7 and 14 days old, (2) is not an "Act of God" or "Liability" claim, and (3) is not a "Damage by Vehicle" claim in which the policyholder was the driver at fault. At this stage, the process has made use of the structured data available. Now, the unstructured text of the claims logs are brought in and linked up with their respective claims. Claims Level Data contains data at the claim level. Activity Level Data contains data at the claims log level, which includes several claims logs, as information comes in at different times.

Figure 2:
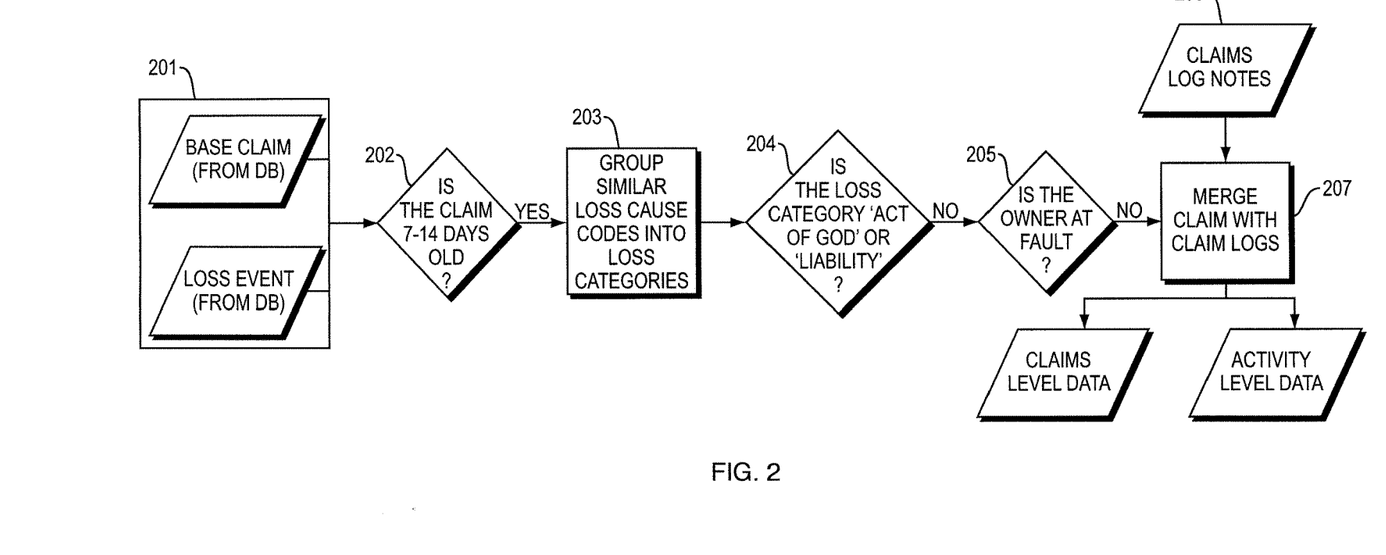
FIG. 2 illustrates an exemplary process for filtering and preparing claims for scoring.

FIG. 2 provides an overview of the process for filtering and preparing claims for scoring in accordance with an exemplary embodiment of the invention. In step 201, structured data, including base claim data and loss event data, is obtained from one or more databases. In step 202, it is determined whether the claim is between 7-14 days old. If not, the claim is not appropriate for scoring using the model. If so, claims associated with similar loss cause codes are grouped into loss categories in step 203. In step 204, it is determined if the loss category is an "Act of God" or "Liability". If not, it is determined if the owner was at fault, in step 205. In step 206, unstructured data from the claims logs is provided and, in step 207, the structured claims data is merged with the unstructured data from the claim logs for their respective claims.

Claims level data include attributes about the overall claim (identifiers, reporting dates, etc. including the linkage to key relationships such as the parties associated with the claim and any opened claim coverages that are identified as potential insurance company obligations with respect to the claim by the claims adjuster). Activity level data are updates and modifications that are appended to the claim (e.g., via database record linking and relationships) over time and after the initial claim reporting event. For the purposes of the embodiments herein, these are textual entries or log notes that are stamped with activity date-time information, the user id of the individual making the update, and the raw notes entered. Each activity level record/log can be treated as an individual document and/or the entire collection of activity level updates can be considered a document as well.

The claims logs of qualifying claims are aggregated at the claim level. The unstructured text may be cleaned in the manner described above with regard to model-building. The remaining text is tokenized and vectorized. Each individual claim is scored against one of the four models, depending on the Loss Category with which it is associated. After being fed through the model, a claim is assigned a probability score (e.g., a mathematical representation of the likelihood of subrogation), based on the previously trained model. The claims and their respective scores across all four Loss Categories are then grouped together and saved.

Figure 3:
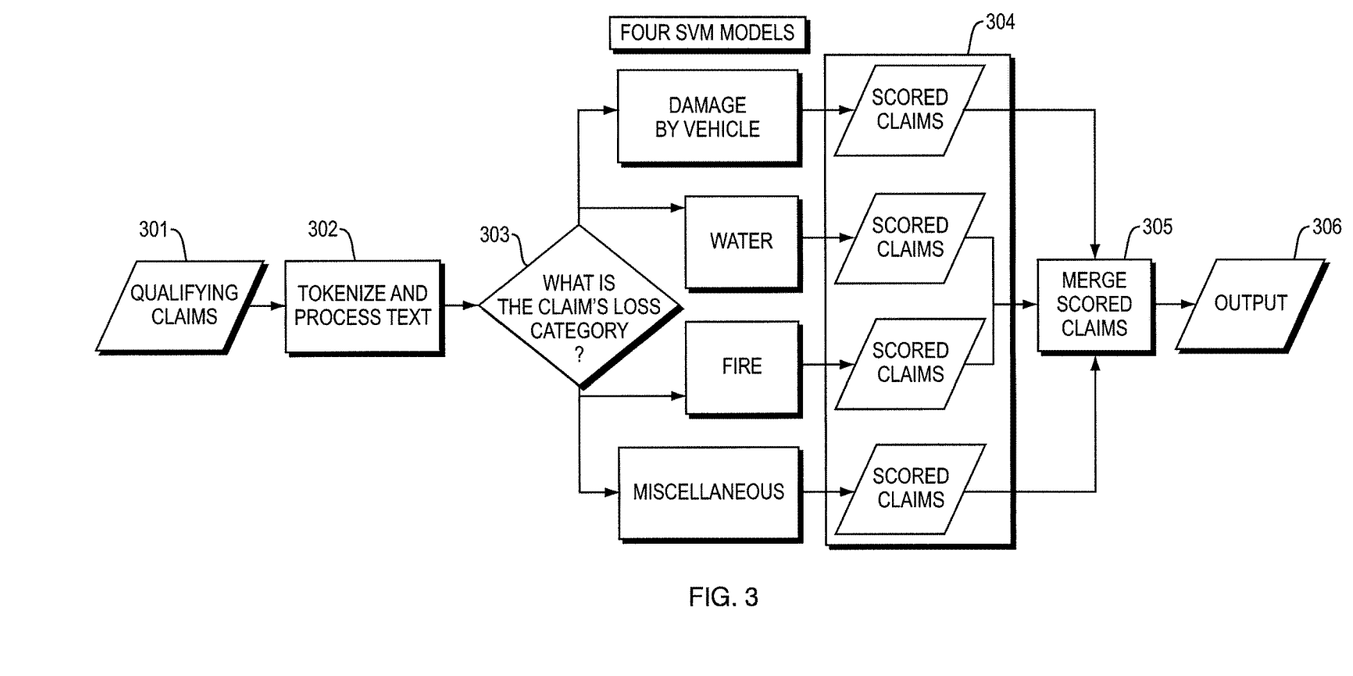
FIG. 3 illustrates an exemplary process for scoring claims.

With reference to FIG. 3, this process is illustrated. In step 301, data regarding qualifying claims is received. In step 302, the textual data is tokenized and otherwise processed. In step 303, the Loss Category for the claim is determined and the data for the claim is fed into the appropriate model. In step 304, the claims are scored using each of the models using, e.g., the SVM modeling as described elsewhere herein. In step 305, the scored claims are merged and, in step 306, the data comprising the claims and associated scores are output.

Referring to step 304 in particular, each model consists of a SVM classifier, which is an established mathematical technique for handling classification (i.e., separating data into two classes in an extremely high-dimensional context—in the embodiments herein, thousands of dimensions). The modeling technique relies on extensive matrix and vector mathematics using extremely large volumes of standard linear algebra calculations. In the embodiment herein, the classification output is binary (i.e., subrogratable claims and non-subrogatable claims). The SVM model built for each category of claims essentially constructs a mathematical hyperplane (also known as a decision surface) that splits the m-dimensional space (m is roughly 2200+ dimensions in the exemplary embodiment, but could be tens of thousands in alternative iterations because each dimension is derived from the words in the document that have a high degree of discriminative power) into the two classes such that each claim can be identified as residing in the subrogatable space or the non-subrogatable space. Raw statistics from the method allow for ranking each claim from 1 to N based on the order of the predictions (e.g., the first claim has the highest relative predicted probability of indeed being subrogatable, the second has the second-highest predicted probability, etc.). As described herein, logistic regression or Naïve Bayes (and potentially other techniques) can be used, but the exemplary embodiment employs an SVM classifier. TF-IDF, which is also used in the solution of an exemplary embodiment as an input to the current SVM classifier, is another means of identifying relevant documents and ranking them (e.g., you could identify a document from a corpus that is most similar to another document that had been previously identified as a positive subrogation example). Models of the same or different types can be combined into an ensemble where each classification decision from such a plurality of models is a arrived at via weighted voting, voting with tie-breaking rules, or other means of choosing a decision from the classification scores from each technique (e.g., another example from such an ensemble might be to choose the class based a "highest probability wins" rule).

Figure 4:
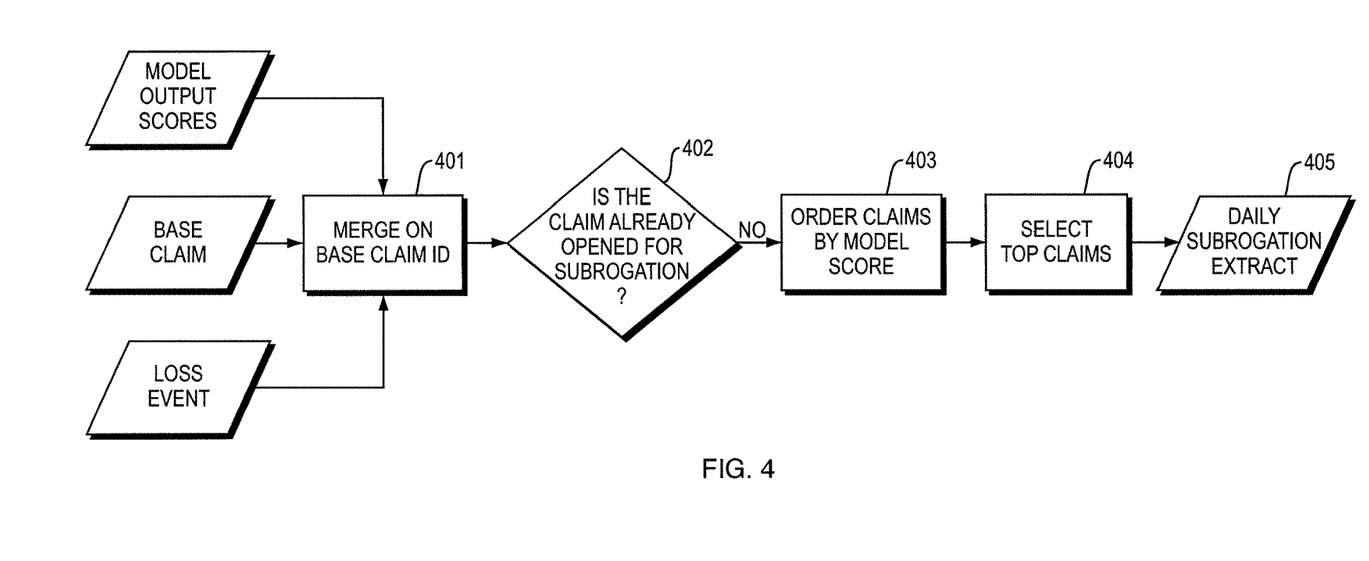
FIG. 4 illustrates an exemplary process for preparing scored claims for daily extract.

After scoring, further work is required to prepare the daily extract file and save the day's scores to the database, as illustrated with reference to FIG. 4. The claim scores (output of step 306 of FIG. 3) are merged back together with the Base Claim and Loss Event tables, so that all relevant information has been gathered, in step 401. A check is made, in step 402, to ensure that none of the claims have already been open for subrogation, as this would result in redundant work. The claims are then ordered according to their probability scores, in step 403. The top claims are then selected, in step 404, and compiled in a daily subrogation extract file, in step 405. The extract file may then, e.g., be sent to a subrogation specialist for further review.

The process described herein is efficient and highly robust and can significantly increase subrogation opportunities on an ongoing basis. Whereas a single claim may take an adjuster minutes to review for subrogation potential, the model is capable of reviewing tens of thousands of claims in a matter of minutes. In the exemplary embodiment, the computer that is improved by being programmed with the code described herein has a nominal run time of approximately 22 minutes or less.

Further, the only current mechanism for identifying subrogation opportunities is manual review. The improved computer modeling process removes the inconsistency inherent in claims adjusters working manually and independently in the field and reduces identification to one standardized and highly automated process that is different from, and cannot be achieved by, a manual process.

For example, the computerized process described herein can score approximately 10,000 or more claims on a daily basis. Each claim may have one or more log notes (activity entries) on day 1 and could have between 20 and 40 by the time the 7 day window, described elsewhere herein, has been reached. The average for a claim is over 7 entries each with over 100 words but potentially having a few thousand words each. Even after some of the text processing described herein to reduce the words, a matrix of tens of thousands of documents by tens of thousands of terms may result. Mathematical operations must occur in both dimensions of the matrix (row-based and column-based), and additional operations must combine those results just to produce the weighted TF-IDF scores. For example, 10000 docs×50000 terms would yield an initial base of 500 MM operations just to generate a portion of the data used in the process. Additional passes over the structure would be required to produce the final TF-IDF score. The SVM classifier also must calculate across a similar matrix space focused on a critical subset of the terms that are identified, which results in a large volume of additional vector and matrix math. If the current embodiment is scaled, the resulting size of the matrices would scale in both dimensions (thus, geometric growth). Given human error rates on calculations, the ability to accurately process the data and perform accurate calculations to identify the subrogation opportunities as described herein being performed by the invention is not possible for humans to perform. Only a computer can complete these operations in a reasonable time to allow this process to be executed on at least daily basis.

In an exemplary embodiment, the subrogation model is trained and executed using Python programming language, as described below. However, as will be understood by those skilled in the art, other programming languages can be used within the scope of the present invention. Exemplary modules are illustrated and described with reference to FIGS. 5A and 5B.

Claims.py Module 502

Figure 5A:
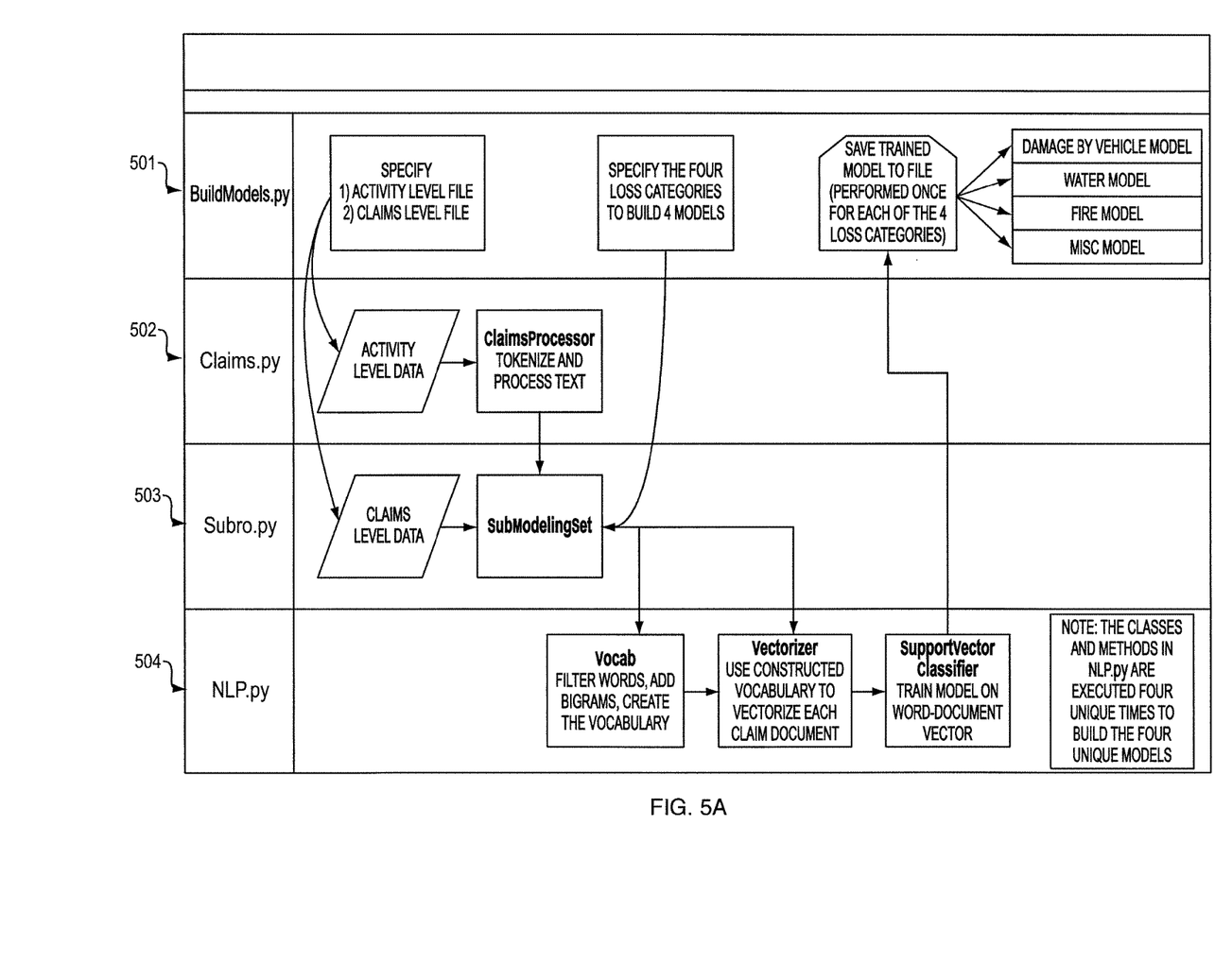
FIG. 5A illustrates an exemplary process for training a model.
Figure 5B:
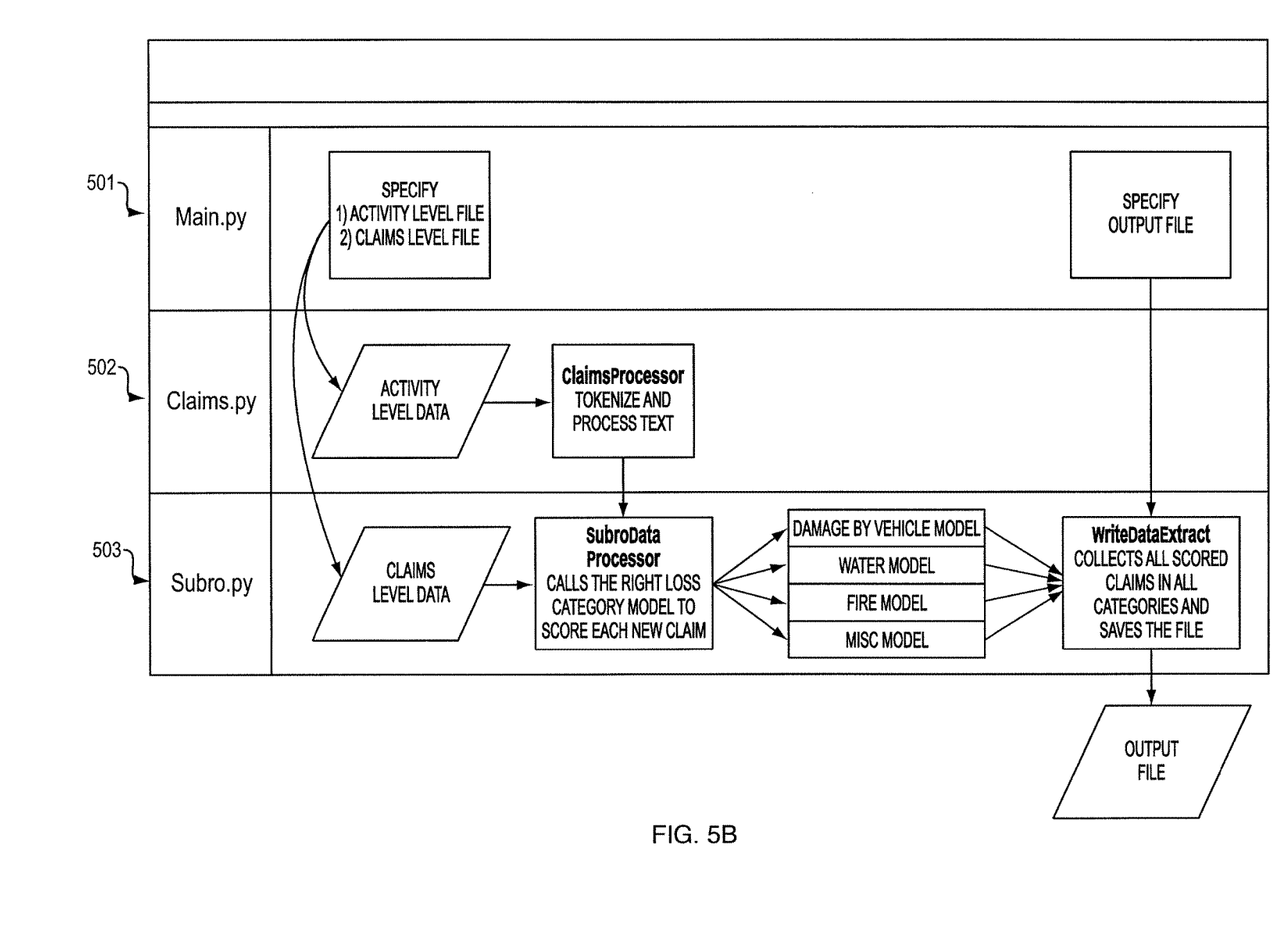
FIG. 5B illustrates an exemplary process for executing a model.

This module reads in Activity Level Data and performs tokenizing (i.e., breaking up individual words in a long string into a list of words) and some processing on the text. The user calls ClaimsProcessor to read in a tab delimited file with the columns "Base_Claim_Id", "Activity_Dt", "Activity_Tm", "Log_Detail_Ds". The other classes in the module assist ClaimsProcessor in performing its tasks. ClaimsProcessor also has the ability to process a claims file in connection with model execution.

Subro.py Module 503

This module contains two classes that perform two functions: SubroModelingSet and SubroDataProcessor. SubroModelingSet is executed on the analyst's computer to build the actual models from a training set of past claims. The user can specify the proportion of data to be excluded as a holdout set upon which to test the newly trained model. This object provides the option of subsetting the data by some list of covariate fields. In the case of the Subrogation Model, the data is subset by the Loss_Category field. Four separately trained models can then be created for each unique loss category from a single SubroModelingSet class object. SubroDataProcessor is used during production. It assumes that model objects have been saved in the appropriate location. It brings in new claims and scores them against the saved models, relative to Loss Category. It returns an ordered list of claims, with the highest scored claims at the top. Then, it writes that ordered list to a daily extract file which the user specifies in the initiation of the class object.

The modules described herein provide a suite of methods that clean up the text, such as removing white space and removing instances of multiple punctuation characters. They make use of predetermined Regular Expression rules to perform many of their tasks. They also contain the BigramReplacer and AbbrevReplacer classes to handle pre-specified bigrams and abbreviations. The clean method is called by ClaimLogEntry. Replace_bigrams( ) and replace_abbrevs( ) are called by NLP.Vocab as well as NLP.Vectorizer. In other embodiments, text processing steps may occur in a unified manner, e.g., bigrams and abbreviations may be handled upfront during the claims processing stage.

NLP.Vocab analyzes all of the text from all of the documents and creates a vocabulary of unique words. It finds and handles bigrams and abbreviations. It also filters out stop words, infrequent words, numbers, non-dictionary terms, common first names, and frequent words that occur in every claim regardless of loss class (e.g., policyholder, damages, etc.).

NLP.Vectorizer takes a constructed vocabulary list as well as the document texts and turns each document into a vector of word counts in which each word in the vocabulary is granted its own column. This process creates a large, sparse matrix with the rows representing individual documents and the columns representing individual words. The class also provides functionality to convert this large feature matrix into a TF-IDF transform. This is especially important if the SVM model is to be tested on a holdout set, because the test set can be hidden from the TF-IDF training step. By way of further explanation, when a model is fit to data, the data set may synonymously be referred to as the training, learning, or fitting set. A separate hold-out sample is used for testing and validation purposes. The test/hold-out set should not include the TF-IDF scores that were calculated during the learning phase; thus, in a preferred embodiment, such scores would not be included if the goal is to understand the isolated performance of the SupportVectorClassifier in a pure sense. Thus, the TF-IDF matrix should not be built with the test set included, in the preferred embodiment, because it would impact the weights assigned to each vector.

Referring now more specifically to the TF-IDF score, the TF-IDF score is calculated from the matrix of terms (rows) and documents (columns). TF-IDF is then added to the matrix itself from which it was calculated. This TF-IDF score establishes a measure of discriminative power of the term based on its term frequency (how often it occurs in a given document) and its inverse document frequency (IDF)—how many documents in which the term occurs. For example, the word "the" has a high TF score, but a low IDF score since it will appear in nearly every document. Thus, a word that actually does occur in every document sends IDF to zero and thus the TF×IDF product becomes zero indicating that the word (e.g., "the") has no discriminative power in classifying the documents corpus (collection of documents).

NLP.SupportVectorClassifier builds the model and classifies new data against it. This class can build either a support vector machine or a logistic regression, depending on user input. The two fit very well into the same class together because they are essentially the same model, but for their respective cost functions. Once the class object is instantiated and a model is built, new claims can be scored using get_probs( ) which returns the probabilities of "yes subrogation" for new claims. SubroDataProcessor calls this method to order claims by their likelihood of subrogation opportunity based on the trained model. Both classify( ) and get_probs( ) perform a TF-IDF transformation on the test data using the same weights that were used to transform the training data matrix.

NLP.py Module 504

This module is used to build the models. A description of text classification concepts such as vectorizing, TF-IDF, and SVM is provided above.

Build_Models.py Module 501/do_CV.py Modules

These modules subset data by Loss Category and then train and test models. These modules can be used to determine how to call these classes (and how the classes themselves interact) to create production-grade SVM models saved to .pkl objects.

Text_processing.py may be a subcomponent (i.e., for convenience of code maintenance) of the NLP.py module 504 that assists in further preparing the text after the tokenize step in "ClaimsProcessor". Specifically, it handles the "Vocab" and "Vectorizer" components shown in FIG. 5A as part of the NLP.py module 504.

Main.py Module 505

This is the module that is called to perform on the server with models already built and stored in the models subdirectory. It requires three inputs: a claims level file, activity level file, and output file.

Figure 6:
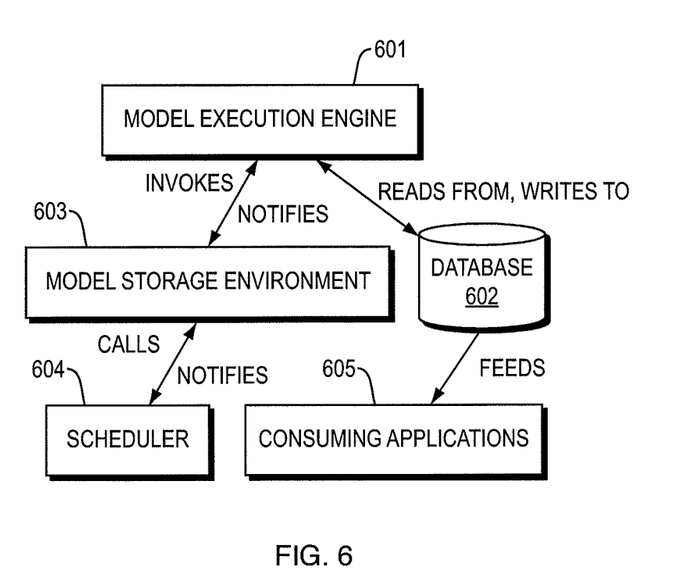
FIG. 6 illustrates exemplary software components for use in carrying out an embodiment of the present invention.

FIG. 6 illustrates components of an exemplary production model execution environment, with functional dependencies noted. FIG. 6 shows how a production modeling environment may consist of scheduling and storage components, as well as an execution engine. FIG. 6 shows that the model execution engine 601 may read and write to a database 602. It may also invoke models from the model storage environment 603, and receive notifications from the model storage environment 603. The model storage environment 603 may call the scheduler 104 and receive notifications from the same. The database 602 feeds data to consuming applications 605.

Figure 7:
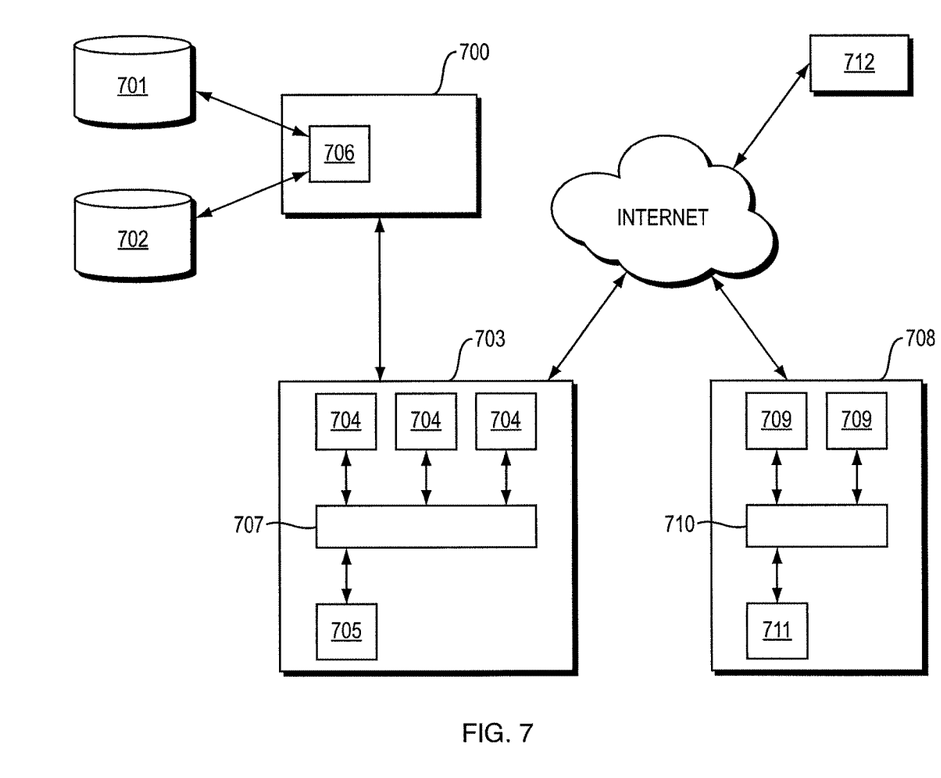
FIG. 7 illustrates an exemplary system of the present invention.

Exemplary hardware and software employed by the systems are now generally described with reference to FIG. 7. Database server(s) 700 may include a database services management application 706 that manages storage and retrieval of data from the database(s) 701, 702. The databases may be relational databases; however, other data organizational structure may be used without departing from the scope of the present invention. One or more application server(s) 703 are in communication with the database server 700. The application server 703 communicates requests for data to the database server 700. The database server 700 retrieves the requested data. The application server 703 may also send data to the database server for storage in the database(s) 701, 702. The application server 703 comprises one or more processors 704, computer readable storage media 705 that store programs (computer readable instructions) for execution by the processor(s), and an interface 707 between the processor(s) 704 and computer readable storage media 705. The application server may store the computer programs referred to herein, including those used in training and executing the models.

To the extent data and information is communicated over the Internet, one or more Internet servers 708 may be employed. The Internet server 708 also comprises one or more processors 709, computer readable storage media 711 that store programs (computer readable instructions) for execution by the processor(s) 709, and an interface 710 between the processor(s) 709 and computer readable storage media 711. The Internet server 708 is employed to deliver content that can be accessed through the communications network, e.g., by end user 712. When data is requested through an application, such as an Internet browser, the Internet server 708 receives and processes the request. The Internet server 708 sends the data or application requested along with user interface instructions for displaying a user interface.

The computers referenced herein are specially programmed to perform the functionality described herein as performed by the software programs.

The non-transitory computer readable storage media may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer implemented method comprising:
   receiving at a computer processor a set of unstructured textual property claims data corresponding to a plurality of property loss insurance claims, wherein the set of unstructured textual property claims data comprises data describing claims associated with subrogation and claims not associated with subrogation, wherein a number of the claims associated with subrogation is the same as a number of the claims not associated with subrogation;

removing, using the computer processor, at least certain textual data from the set of unstructured textual property claims data to form an initial vocabulary set of textual data;

adding, using the computer processor, one or more bigrams to the vocabulary set of textual data to form a final vocabulary set of textual data;

identifying, using the computer processor, a property loss type for each of the plurality of property loss insurance claims;

dividing, using the computer processor, the final vocabulary set of textual data into a plurality of subsets of textual data based on the property loss type;

training, using the computer processor, a model using each of the plurality of subsets of textual data to form a plurality of trained models, each corresponding to one of the property loss types receiving at the computer processor data describing a property insurance loss claim;

determining, using the computer processor, whether the property insurance loss claim is a qualifying claim;

identifying, using the computer processor, a property loss type associated with the property insurance loss claim;

selecting, using the computer processor, one of the plurality of models based on the identified property loss type;

processing, using the computer processor, the data describing the property insurance loss claim using the selected model; and determining, using the computer processor, whether to analyze the property insurance loss claim for subrogation based on the processing.

2. The computer implemented method of claim 1 wherein the certain textual data removed from the set of unstructured textual data comprises one or more of numbers, punctuation, stop words, and context-specific words that occur within the set of unstructured textual property claims data with a predetermined level of frequency.

3. The computer implemented method of claim 1 wherein the property loss type comprises one of water, fire and damage by vehicle.

4. The computer implemented method of claim 1 wherein the determining comprises determining whether the property insurance loss claim was initiated within the past 7 to 14 days.

5. A non-transitory computer readable storage medium having stored thereon computer executable instructions that, when executed on a computer, configure the computer to perform a method comprising:

receiving a set of unstructured textual property claims data corresponding to a plurality of property loss insurance claims, wherein the set of unstructured textual property claims data comprises data describing claims associated with subrogation and claims not associated with subrogation, wherein a number of the claims associated with subrogation is the same as a number of the claims not associated with subrogation;

removing at least certain textual data from the set of unstructured textual property claims data to form an initial vocabulary set of textual data;

adding one or more bigrams to the vocabulary set of textual data to form a final vocabulary set of textual data;

identifying a property loss type for each of the plurality of property loss insurance claims;

dividing the final vocabulary set of textual data into a plurality of subsets of textual data based on the property loss type;

training a model using each of the plurality of subsets of textual data to form a plurality of trained models, each corresponding to one of the property loss types;

receiving data describing a property insurance loss claim;

determining whether the property insurance loss claim is a qualifying claim;

identifying a property loss type associated with the property insurance loss claim;

selecting one of the plurality of models based on the identified property loss type;

processing the data describing the property insurance loss claim using the selected model; and determining whether to analyze the property insurance loss claim for subrogation based on the processing.

6. The non-transitory computer readable storage medium of claim 5 wherein the certain textual data removed from the set of unstructured textual data comprises one or more of numbers, punctuation, stop words, and context-specific words that occur within the set of unstructured textual property claims data with a predetermined level of frequency.

7. The non-transitory computer readable storage medium of claim 5 wherein the property loss type comprises one of water, fire and damage by vehicle.

8. The non-transitory computer readable storage medium of claim 5 wherein the determining comprises determining whether the property insurance loss claim was initiated within the past 7 to 14 days.

9. A system comprising:

memory operable to store at least one program; and at least one processor communicatively coupled to the memory, in which the at least one program, when executed by the at least one processor, causes the at least one processor to perform a method comprising:

receiving a set of unstructured textual property claims data corresponding to a plurality of property loss insurance claims, wherein the set of unstructured textual property claims data comprises data describing claims associated with subrogation and claims not associated with subrogation, wherein a number of the claims associated with subrogation is the same as a number of the claims not associated with subrogation;

removing at least certain textual data from the set of unstructured textual property claims data to form an initial vocabulary set of textual data;

adding one or more bigrams to the vocabulary set of textual data to form a final vocabulary set of textual data;

identifying a property loss type for each of the plurality of property loss insurance claims;

dividing the final vocabulary set of textual data into a plurality of subsets of textual data based on the property loss type; and training a model using each of the plurality of subsets of textual data to form a plurality of trained models, each corresponding to one of the property loss types;

receiving data describing a property insurance loss claim;

determining whether the property insurance loss claim is a qualifying claim;

identifying a property loss type associated with the property insurance loss claim;

selecting one of the plurality of models based on the identified property loss type;

processing the data describing the property insurance loss claim using the selected model; and determining whether to analyze the property insurance loss claim for subrogation based on the processing.

10. The system of claim 9 wherein the certain textual data removed from the set of unstructured textual data comprises one or more of numbers, punctuation, stop words, and context-specific words that occur within the set of unstructured textual property claims data with a predetermined level of frequency.

11. The system of claim 9 wherein the property loss type comprises one of water, fire and damage by vehicle.

12. The system of claim 9 wherein the determining comprises determining whether the property insurance loss claim was initiated within the past 7 to 14 days.

* * * * *